(12) United States Patent
Yoshikawa (10) Patent No.: US 7,457,051 B2
(45) Date of Patent: Nov. 25, 2008

(54) IMAGING APPARATUS (75) Inventor: Koichi Yoshikawa, Kanagawa (JP)

(73) Assignee: Sony Corporation (JP)

( * ) Notice: Subject to any disclaimer, the term of this patent is extended or adjusted under 35 U.S.C. 154(b) by 11 days.

(21) Appl. No.: 11/632,632

(22) PCT Filed: Jul. 8, 2005

(86) PCT No.: PCT/JP2005/013095

§ 371 (c)(1),
(2), (4) Date: Jan. 16, 2007

(87) PCT Pub. No.: WO2006/009088

PCT Pub. Date: Jan. 26, 2006

(65) Prior Publication Data

US 2008/0030879 A1 Feb. 7, 2008

(30) Foreign Application Priority Data

Jul. 16, 2004 (JP) ............................. 2004-210255

(51) Int. Cl.
*G02B 17/00* (2006.01)
(52) U.S. Cl. ..................... 359/726; 359/727; 348/16; 348/36
(58) Field of Classification Search ................. 359/726, 359/727, 728; 348/16, 36, 47, 222.1
See application file for complete search history.

(56) References Cited

U.S. PATENT DOCUMENTS 7,006,123 B2 * 2/2006 Yoshikawa et al. ............ 348/36

2004/0042782 A1 3/2004 Koichi et al.

FOREIGN PATENT DOCUMENTS

JP 39-8140 5/1964

(Continued)

OTHER PUBLICATIONS

Communication from European Patent Office for application No. 05765812.2-2209 dated Aug. 8, 2008.

*Primary Examiner*—Timothy J Thompson
(74) *Attorney, Agent, or Firm*—Rader Fishman & Grauer PLLC; Ronald P. Kananen (57) ABSTRACT The present invention provides an imaging apparatus capable of imaging a wide area, controlling parallax to achieve an excellent image quality, and utilizing an imaging element with a relatively large package.

The imaging apparatus for imaging a wide area as a subject by dividing the subject into a plurality of subject portions and respectively imaging the subject portions using a plurality of imaging means 11, 12 is configured such that the imaging means 11, 12 includes lenses 1, 3A, 3B, and imaging element 6; respective NP points 9 of the a plurality of imaging means 11, 12 are concentrated within a minute radius region based on one of the NP points as a center; an optical element 5 having a reflection function is arranged behind a refraction surface of the lens 1 located at the nearest position from the subject in each of the imaging means 11, 12; the imaging element 6 is arranged behind the optical element 5 having the reflection function and outside of a space formed by straight lines which pass from the NP point 9 to circumferential portions in respective directions of the lens 1; and light beams bent by the optical element 5 having the reflection function are detected by the imaging element 6.

8 Claims, 4 Drawing Sheets

FOREIGN PATENT DOCUMENTS

| | | |
|---|---|---|
| JP | 10-145657 | 5/1998 |
| JP | 2002-229138 A | 8/2002 |
| JP | 2002-320124 | 10/2002 |
| JP | 2003-162018 | 6/2003 |
| JP | 2003-330133 | 11/2003 |

* cited by examiner

IMAGING APPARATUS

TECHNICAL FIELD

The present invention relates to an imaging apparatus capable of imaging a wide area, such as imaging all directions of the area, or the like.

BACKGROUND ART

As is well known in the related art, various types of cameras, each of which includes a number of video cameras housed in one chassis, have been developed for imaging all directions or an entire circumference simultaneously.

In the arrangement of the above-mentioned camera, unless the viewpoint centers of the video cameras coincide with one another, a plurality of images cannot be stitched while maintaining a high quality due to the occurrence of parallax.

Consequently, in order to solve the parallax problem, there have been proposed, for example, an arrangement where viewpoint centers of a plurality of cameras are virtually caused to approximately coincide with one another using a mirror (see Patent Document 1), an optical system capable of eliminating the parallax problem without using a mirror (that is, realizing non-parallax) (see Patent Document 2), and the like.

[Patent Document 1] Japanese Published Patent No. S39-8140

[Patent Document 2] Japanese Unexamined Patent publication No. 2003-162018

DISCLOSURE OF THE INVENTION

However, in the arrangement of the former using a mirror, there have been problems in that handling of the apparatus can be difficult because the whole apparatus becomes large in size due to the necessities for a cubic volume of the mirror portion and for preventing the occurrence of a crack in and dirt on the mirror.

In contrast, the optical system of the latter arrangement realizing non-parallax has the advantages of realizing a reduction in size of the apparatus and handling of lens with ease, similar to that of a normal lens, without using a mirror.

However, in the arrangement of the latter, since it is necessary to satisfy a condition under which the optical system including an imaging element is arranged within a space formed by lines passing from a non-parallax point (NP point) relative to a viewpoint center to outer circumferential portions of the lens in respective directions, use of the imaging element can be difficult unless the element is formed with a relatively small package.

Consequently, there has been a problem in that the selectability of imaging elements can be restricted.

In contrast, if an imaging element formed with a relatively large package is used, a general-purpose and inexpensive imaging element, or a relatively large imaging element with a large number of pixels, can also be used. If the number of pixels can be increased, resolution of images also can be improved.

In order to solve the above-mentioned problem, the present invention may provide an imaging apparatus capable of imaging a wide area, controlling parallax to achieve an excellent image quality, and utilizing an imaging element with a relatively large package.

The present invention provides an imaging apparatus for imaging a wide area as a subject by dividing the subject into a plurality of subject portions and respectively imaging the subject portions using a plurality of imaging means, in which; the imaging means includes lenses and an imaging element for detecting light beams passing through the lenses; when selecting main light beams positioned in the Gauss region from the main light beams passing through a center of an aperture diaphragm of the lenses in the imaging means, and an NP point is defined as a point at which a straight line component of the selected main light beams in an object space is extended to intersect with an optical axis, respective NP points of the plurality of imaging means are concentrated within a minute radius region based on one of the NP points as a center; in each of the imaging means, an optical element having a reflection function is arranged behind a refraction surface of a lens located at the nearest position from the subject; the imaging element is arranged behind the optical element having the reflection function and located outside of a space formed by straight lines which pass from the NP point to circumferential portions in respective directions of the lens; and light beams bent by the optical element having the reflection function are detected by the imaging element.

According to the above-mentioned arrangement of the imaging apparatus of the present invention, parallax occurring between respective imaging means can be eliminated by concentrating respective NP points of a plurality of imaging means within a predetermined radius region formed based on one of the NP points as a center.

Since a plurality of divided subject portions obtained by dividing a wide area of the subject are respectively and individually imaged by a plurality of imaging means, the wide area of the subject can be imaged without the occurrence of parallax.

Further, in each imaging means, since an optical element having a reflection function is arranged behind the backside of a refraction surface of a lens located at the nearest position from the subject, and an imaging element is arranged behind the backside of the optical element and outside of a space formed by straight lines passing from an NP point to outer circumferential portions of the lenses in respective directions, an imaging element having a relatively large package can be used for the imaging element located outside thereof regardless of the size of the space formed by straight lines from the NP point to the outer circumferential portions of the lens in respective directions.

This enables the apparatus to employ an existing general-purpose imaging element having a relatively large package. For example, this enables the apparatus to employ a CCD solid-state imaging element capable of producing an image with high image quality and high-definition, or a CMOS type solid-state imaging element having high-function.

In addition, the aforementioned imaging apparatus of the present invention may be arranged such that the respective imaging elements are arranged so as not to spatially interfere with each other in the adjacent imaging means.

With this arrangement, since the imaging elements of adjacent imaging means do not spatially interfere with each other, the NP points of the adjacent imaging means can approximately coincide with each other even if an imaging element with a relatively large package is used.

The aforementioned imaging apparatus of the present invention also may be arranged such that the bending directions of the light beams by the optical elements differ from each other in the adjacent imaging means.

With this arrangement, since the bending directions of the light beams by the optical elements are appropriately selected, the imaging elements of the adjacent imaging means will not spatially interfere with each other.

According to the above-mentioned present invention, an imaging element with a relatively large package can be employed while a wide area, such as all directions of the area, can be imaged while eliminating the parallax between the respective imaging means.

Since a plurality of imaging means share the imaging region to image a wide area, the wide area can be imaged with high resolution by the respective cameras having high resolution.

Further, according to the present invention, since the selectability of imaging elements can be increased, the design of an imaging apparatus can be increasingly flexible.

Since an imaging element with a large package can be used, imaging high-definition images can be achieved with increased resolution using a relatively large imaging element with a large number of pixels.

Further, the imaging means can be reduced in size regardless of package sizes of the imaging elements, whereby the entire imaging apparatus can be reduced in size and weight.

BEST MODE FOR CARRYING OUT THE INVENTION

Figure 1:
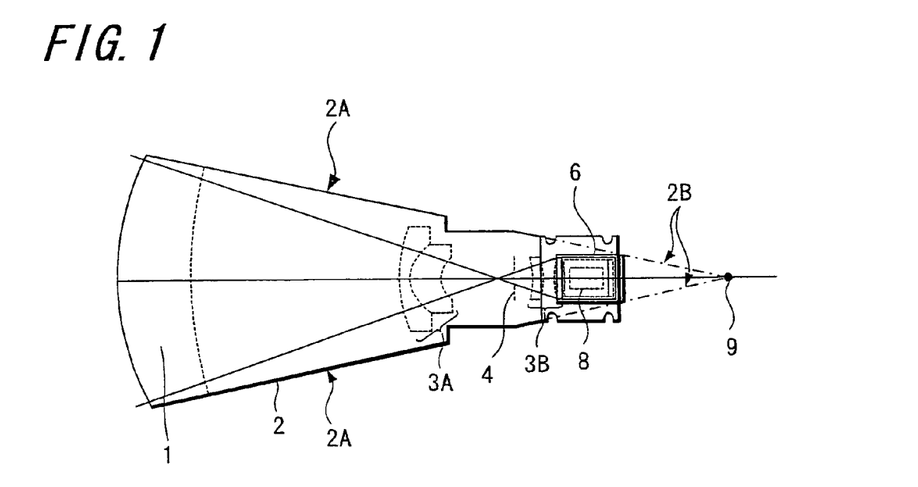
FIG. 1 is a schematic view (top view) of one imaging unit forming an imaging apparatus according to one embodiment of the present invention.
Figure 2:
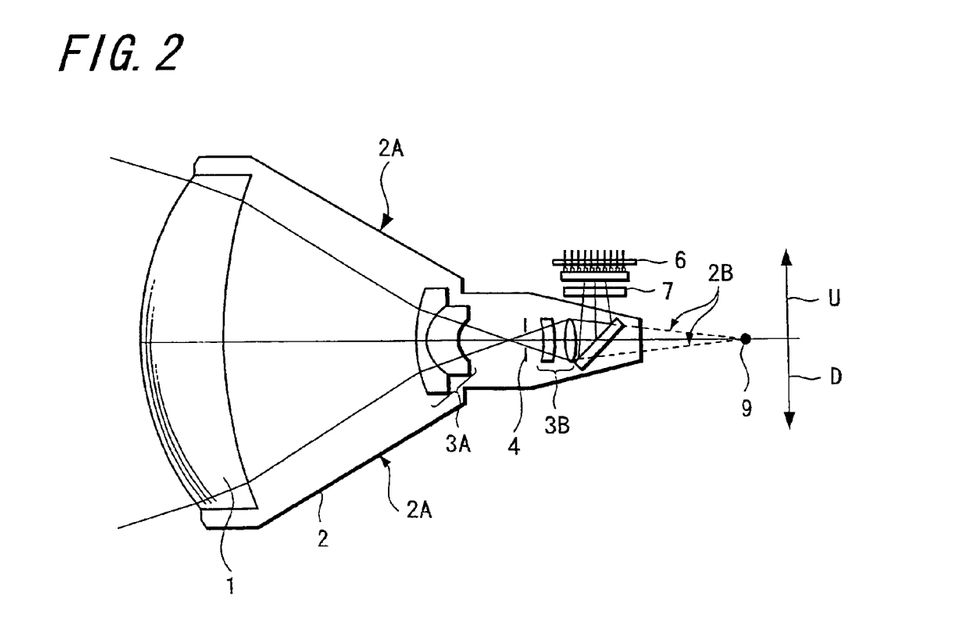
FIG. 2 is a cross-sectional view of the imaging unit in FIG. 1 shown from the side thereof.

FIG. 1 and FIG. 2 show schematic views of one imaging unit (camera) forming an imaging apparatus as one embodiment of the present invention. FIG. 1 is a top view thereof, and FIG. 2 is a side view thereof.

The imaging apparatus is formed by radially arranging a plurality of the imaging units (cameras) shown in FIG. 1 and FIG. 2 and attaching the imaging units adjacent to each other.

As shown in FIG. 1 and FIG. 2, each imaging unit (camera) includes a front lens piece 1 provided in the front end of the imaging unit and lens groups (first lens group 3A and second lens group 3B) formed of a plurality of lenses located behind the backside of the front lens piece 1. In addition, an aperture diaphragm 4 is placed between the first lens group 3A and the second lens group 3B.

The front lens piece 1, the first lens group 3A, the second lens group 3B, and the aperture diaphragm 4 are respectively arranged inside a lens barrel 2 along the center axis of the lens barrel 2.

The respective imaging units are arranged such that the respective NP points 9 of the imaging units coincide with each other to form a viewpoint center.

The NP point 9, which is also described in the above-mentioned Patent Document 2, refers to a point determined by selecting those of the main light beams positioned in the Gauss region passing through the center of the aperture diaphragm 4 of the imaging unit (camera) lens and extending the straight line component in an object space formed by the selected main light beams to intersect with the optical axis. Then, the parallax between the images which occurs when imaged by a plurality of imaging units (cameras) can be prevented by configuring the apparatus such that the NP points 9 of the imaging units (cameras) approximately coincide with each other by determining the NP point 9 as a viewpoint center.

Making the NP points 9 of the respective imaging units approximately coincide with each other specifically corresponds to setting the NP points 9 of the respective imaging units within a predetermined radius region (sphere).

In order to eliminate parallax and stitch up the images that are imaged by the respective imaging units, the imaging apparatus should be arranged such that at least the NP points 9 of the respective imaging units are positioned within a radius region (sphere) of approximately 50 mm, and more preferably, within a radius region (sphere) of approximately 20 mm.

The lens barrel 2 is attached with a laterally adjacent imaging unit (camera) through connection surfaces shown by lines 2A in FIG. 1.

An intersection point of extended lines 2B from the connection surfaces 2A with the NP in the lens barrel 2 approximately coincides with the NP point 9. It should be noted that this connection surface 2A approximately coincides with a space formed by the straight lines passing from a NP point to outer circumferential portions of the lenses of the front lens piece 1 in respective directions.

The front lens piece 1 and the lens groups 3A, and 3B are arranged such that the center axes of the respective lenses coincide with the center axis of the lens barrel 2.

In this embodiment, in particular, since an optical mirror 5 is provided behind the backside of the second lens group 3B, the light beams from the subject are reflected by the optical mirror 5, whereby the light path is bent in an upward direction U in FIG. 2.

Then, an imaging element 6 is arranged such that the light beams reflected by the optical mirror 5 can be received, and is arranged outside of the lens barrel 2. Specifically, the imaging element 6 is arranged outside of a space formed by the straight lines passing from an NP point to outer circumferential portions of the lenses of the front lens piece 1 in respective directions.

This imaging element 6 has a larger area than the cross sectional area of the portion of the lens barrel 2 where the optical mirror 5 is placed.

The imaging element 6 is arranged within a unit (not shown) attached to the outside of the lens barrel 2.

A filter 7, an adjustment mechanism of an optical system (not shown), or the like may be provided within this unit, other than the imaging element 6.

Since the optical system of the imaging unit is arranged in this manner, after the light beams from the subject pass through the front lens piece 1 located at the nearest position from the subject, and then further pass through the first lens group 3A, the aperture diaphragm 4, and the second lens group 3B, the light beams are bent upward by approximately 90 degrees by the optical mirror 5, thereby forming an image on a light receiving surface of the imaging element 6. Accordingly, the light beams from the subject may be light-received and detected by the imaging element 6.

In addition, since the light beams are bent by the optical mirror 5 and are light-received and detected by the imaging element 6 located outside of the lens barrel 2, the imaging element 6 may not be included within the lens barrel 2, thereby allowing the optical system to employ a relatively large imaging element 6.

Similarly, since the filter 7 is not necessarily included within the lens barrel 2, a relatively large size of the filter 7 also may be used.

Figure 3:
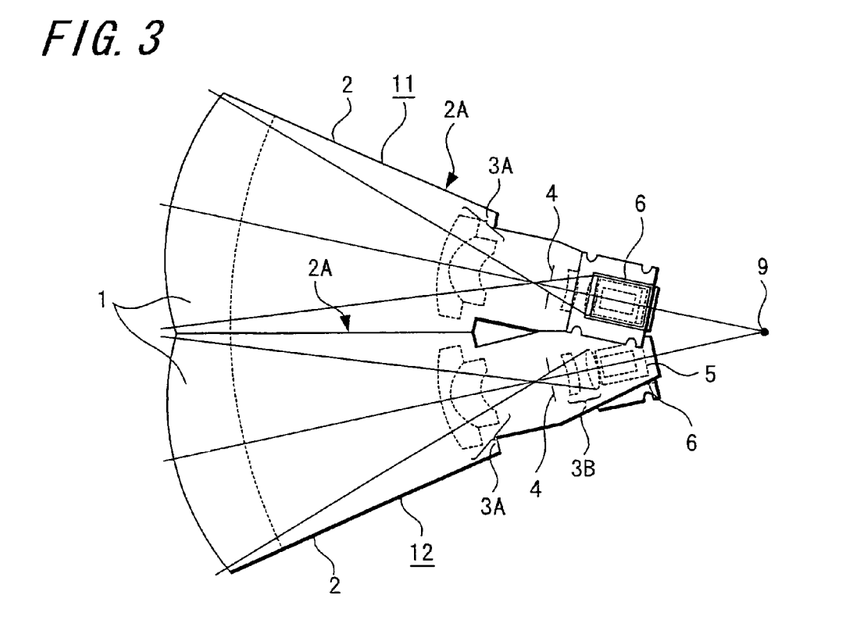
FIG. 3 is a schematic plan view of an imaging apparatus according to one embodiment of the present invention where two of the imaging units are arranged adjacent to each other.

In an imaging apparatus (camera) of this embodiment, a plurality of imaging units, for example, two imaging units 11, 12 as shown in FIG. 3, are arranged in contact with each other along the connection surface 2A of the lens barrel 2 in the horizontal direction, thereby enabling the imaging apparatus to image a wide area in the horizontal direction.

FIG. 3 is a plan view showing an upward direction U in FIG. 2.

As shown in FIG. 3, since the NP point 9 is approximately shared between the two imaging units 11, 12 in the optical system, the image can be obtained without generating parallax. This is because the imaging units 11, 12 are arranged such that both of the units are included within a space formed by straight lines passing from an NP point to outer circumferential portions of the front lens pieces 1 in respective directions in the horizontal direction.

If the imaging element 6 that is used is small, with its package dimensions such as a bear chip, the package of the imaging element can be included within the lens barrel 2 without having the optical axis bent by the optical mirror 5; however, since the package dimensions of a normal CCD solid-state imaging element or a CMOS type solid-state imaging element are large, it may be difficult to include the package within the lens barrel 2.

In contrast, according to the arrangement of this embodiment, since the optical axis is bent in an upward direction U by the optical mirror 5, as shown in FIG. 1 and FIG. 2, even though the imaging element 6 has large package dimensions, an optical system other than the imaging element 6 is included within a space formed by straight lines passing from an NP point to outer circumferential portions of the lenses in respective directions of the front lens piece 1.

Figure 4:
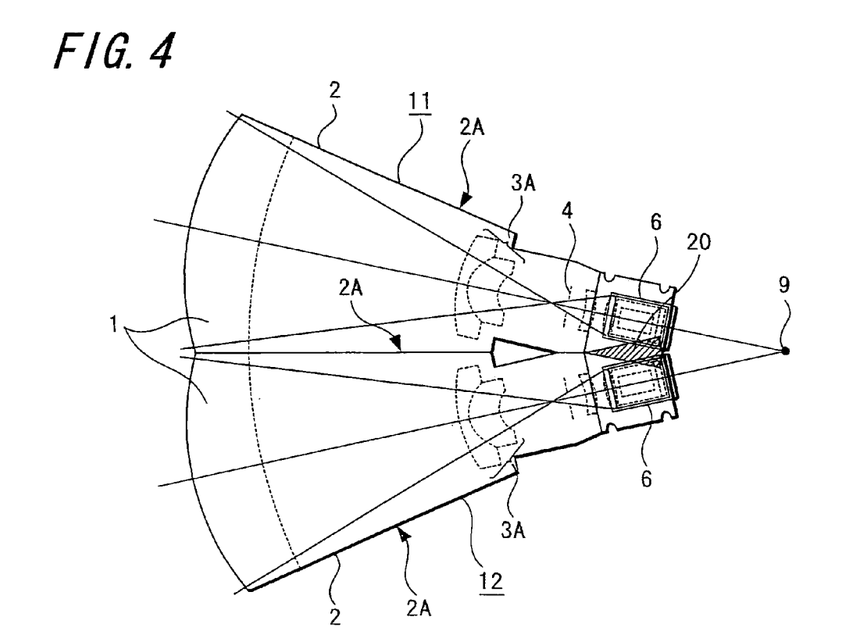
FIG. 4 is a schematic plan view showing an arrangement where two of the imaging units of FIG. 1 and FIG. 2 are placed adjacent to each other.

However, if the imaging units 11, 12 employ the imaging elements 6 with large package dimensions, when the light axes of the adjacent first imaging unit 11 and second imaging unit 12 are arranged such that the axes are bent in an upward direction U shown in FIG. 2, the packages of the imaging elements 6 interfere with each other in a region 20 represented by a shaded portion, whereby the NP point 9 may not be shared between the first imaging unit 11 and second imaging unit 12, as shown in a plan view of FIG. 4.

In order to solve this problem, according to this embodiment as shown in FIG. 3, the first imaging unit 11 is arranged such that the optical axis is bent in an upward direction U by the optical mirror 5, as shown in FIG. 1 and FIG. 2, while the second imaging unit 12 is arranged such that the optical axis is bent in an inverted direction as compared to the optical axes shown in FIG. 1 and FIG. 2, that is, the second imaging unit 12 is arranged such that the optical axis is bent in a downward direction D by the optical mirror 5.

According to this arrangement, the NP point 9 can be shared between the adjacent imaging units 11, 12, because the packages of the imaging elements 6 do not interfere with each other between the adjacent imaging units 11, 12.

It should be noted that the arrangement including two imaging units is illustrated in FIG. 3; however, three or more imaging units may also be included in this arrangement.

If including three or more imaging units, the positions of the imaging elements 6 of the adjacent imaging units are respectively arranged at positions where the imaging elements 6 will not spatially interfere with each other; for example, the imaging elements 6 are arranged in reverse directions from each other, that is, if the imaging elements 6 are arranged alternately in the upward direction U, in the down direction D, in the upward direction U, and in the down direction D, imaging elements 6 having relatively large packages can be utilized for the optical system which controls the occurrence of parallax without a mirror.

Also, if the light paths from the front lens piece 1 to the imaging elements 6 are designed to have the same length in all the imaging units constituting the imaging apparatus, sizes of irradiation spots, focuses of the light entering the imaging elements 6, and the like will be approximately the same in the respective imaging units.

Accordingly, since equal requirements are imposed on specifications for the imaging elements 6 in the respective imaging units, the imaging elements 6 having the same arrangements may be used easily.

Then, according to this embodiment, the imaging apparatus is arranged such that a plurality of divided subject portions formed by dividing a wide area as a subject is individually imaged by the respective imaging units (cameras) 11, 12, and the image information is stitched up one image by an unshown processing means.

As examples of the processing means, a signal process circuit, an editing instrument having a signal processing circuit, or the like can be used. By selecting the arrangement of the processing means, the processing means either may be incorporated into the imaging apparatus or may be connected to the imaging apparatus by being provided outside thereof.

The stitching process is performed immediately after imaging or after having stored the image information once.

According to the embodiment described above, the imaging apparatus is arranged such that the optical mirror 5 is arranged between the second lens group 3B and the imaging element 6 in each of the imaging units 11, 12, and the light beams generated from the subject can be bent by the optical mirror 5 to be light-received by the imaging element 6 placed outside of the lens barrel 2, whereby the imaging element 6 having a cross sectioned area larger than that of the lens barrel 2 with a relatively large package may be used.

Also, the light beams are bent in the upward direction U in the first imaging unit 11, and the light beams are bent in the downward direction D in the second imaging unit 12, either of which are mutually opposite directions bent by the optical mirrors 5 in the adjacent imaging units II, 12, whereby the imaging elements 6 will not spatially interfere with each other.

This enables the imaging apparatus to employ an existing general-purpose imaging element 6 with a relatively large package. In addition, this also enables the imaging apparatus to employ a general-purpose and relatively large filter as the filter 7.

For example, a CCD solid-state imaging element capable of producing an image with high image quality and high-definition or a CMOS type solid-state imaging element with high function may be used.

In particular, since peripheral circuit portions of the CMOS type solid-state imaging element are formed inside the chip, the arrangement of the embodiment is effective owing to the fact that the package becomes large relative to the light receiving surface.

Also, since imaging is performed by dividing an image region using a plurality of imaging units (cameras), a wide area can be imaged with high resolution.

Consequently, according to this embodiment, a wide area, such as all directions of the area, can be imaged using the imaging elements 6 having relatively large packages while eliminating parallax between the respective imaging units 11, 12.

Then, it is possible to realize an imaging apparatus utilizing a wide angle of view, such as a CCD solid-state imaging element, and capable of producing an image with high image quality and high-definition, or a CMOS type solid-state imaging element having high function.

Also, since the selectability of the imaging elements 6 is increased, the design of the imaging apparatus can be increasingly flexible.

Also, since the lens barrel 2 can be reduced in size regardless of the package size of the imaging element 6 as compared with the lens barrel 2 including the imaging element 6 with a large package in each imaging unit, the size and weight of an entire imaging apparatus can be reduced.

Figure 5A:
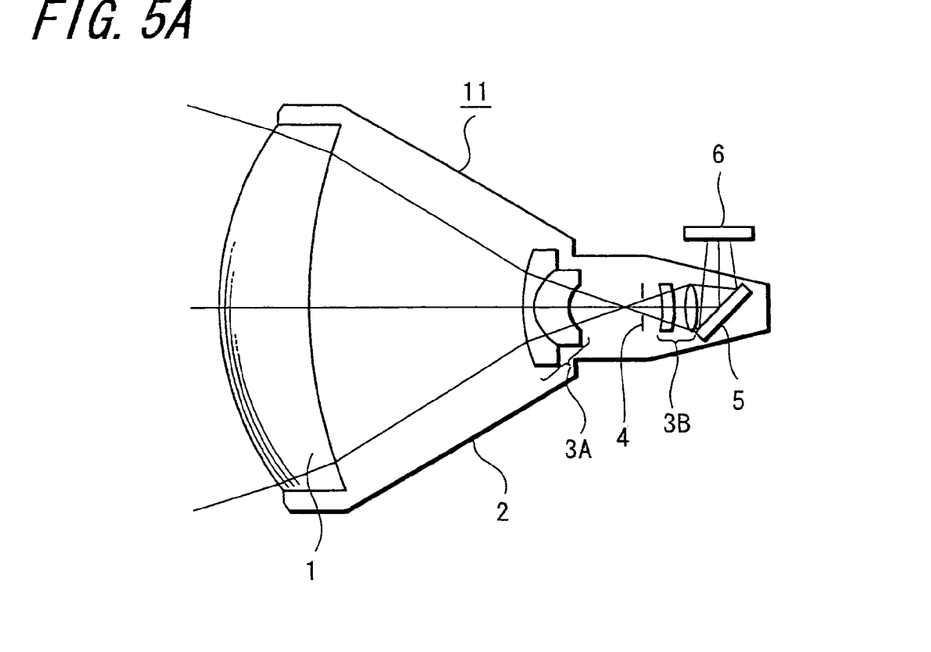
FIGS. 5A and 5B are cross-sectional views showing each imaging unit of an imaging apparatus according to another embodiment of the present invention from the side thereof.
Figure 5B:
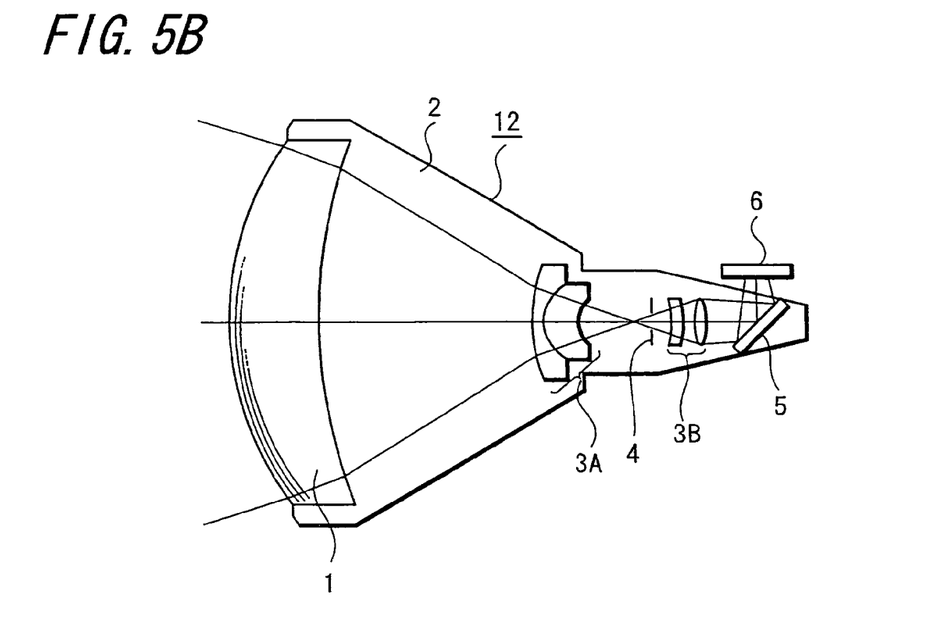

Subsequently, as another embodiment of the present invention, cross sectional views showing respective imaging units from the sides of the respective imaging units forming an imaging apparatus are shown in FIGS. 5A and 5B respectively.

In this embodiment, the imaging elements 6 in the adjacent first imaging unit 11 and second imaging unit 12 are arranged so as not to spatially interfere with each other by shifting the positions of the optical mirrors 5.

Specifically, as shown in FIG. 5A, the optical mirror 5 is arranged close to the second lens group 3B in the first imaging unit 11. Likewise, as shown in FIG. 5B, the optical mirror 5 is arranged so as to be distanced from the second lens group 3B in the second imaging unit 12.

It should be noted that the filter 7 shown in FIG. 2 is omitted in FIGS. 5A and 5B.

Since other arrangements are similar to those of the previous embodiments shown in FIG. 1 to FIG. 3, the same reference numerals are provided and repetitive explanations thereof are omitted.

According to the arrangement of the embodiment described above, heights and horizontal positions of the imaging elements 6 are caused to differ by shifting the positions of the optical mirrors 5 backward or forward in the adjacent first imaging unit 11 and second imaging unit 12. Accordingly, the imaging elements 6 cannot spatially interfere with each other.

Consequently, similar to the previous embodiment, an imaging element 6 having a relatively large-scaled package can be used.

It should be noted that the imaging apparatuses in FIGS. 5A and 5B are arranged such that the distances from the second lens groups 3B to the light receiving surface of the imaging elements 6 are approximately the same. Accordingly, since the light path lengths from the front lens pieces 1 to the imaging elements 6 are approximately the same, the specifications required for the, imaging elements 6 are approximately the same, and imaging elements 6 having the same arrangements can be used easily.

Figure 6A:
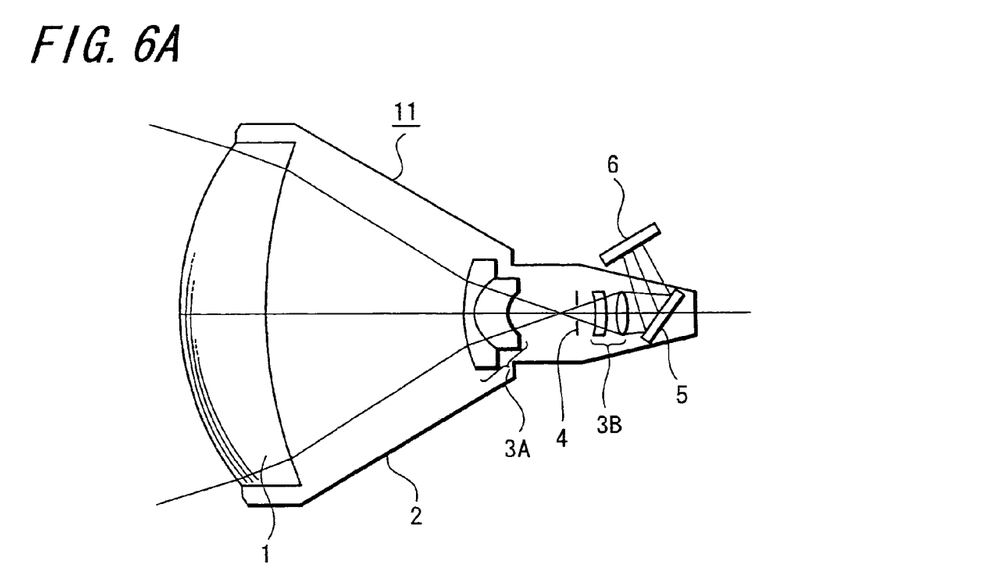
FIGS. 6A and 6B are cross-sectional views showing each imaging unit of an imaging apparatus according to still another embodiment of the present invention shown from the side thereof.
Figure 6B:
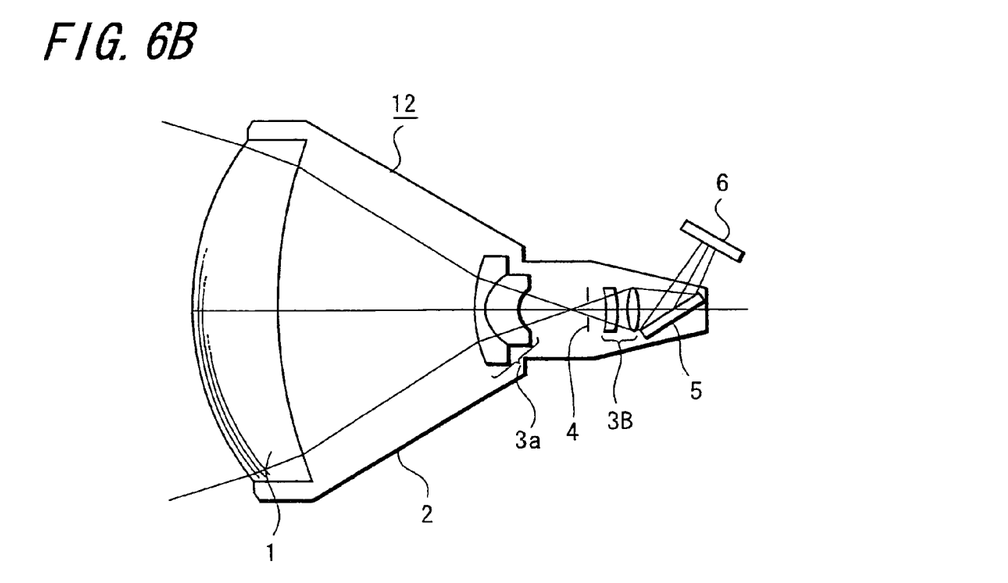

Subsequently, as still another embodiment of the present invention, cross sectional views showing respective imaging units forming the imaging apparatus from the sides thereof are shown in FIGS. 6A and 6B respectively.

In this embodiment, the imaging elements 6 are arranged so as not to spatially interfere with each other by determining an angle differently between the reflection surface of the optical mirror 5 and the optical axis of the incident light from the subject in the adjacent first imaging unit II and second imaging unit 12.

More specifically, as shown in FIG. 6A, the angle formed between the reflection surface of the optical mirror 5 and the optical axis is approximately 60°, indicating the direction close to the vertical axis as compared with 45° of FIG. 2 in the first imaging unit 11. Also, as shown in FIG. 6B, the angle formed between the reflection surface of the optical mirror 5 and the optical axis is approximately 30°, indicating the direction close to the horizontal axis as compared with 45° of FIG. 2 in the second imaging unit 12.

It should be noted that the illustration of the filter 7 shown in FIG. 2 is omitted in FIGS. 6A and 6B.

Since other arrangements are similar to those of the previous embodiments shown in FIG. 1 to FIG. 3, the same reference numerals are provided and repetitive explanations thereof are omitted.

According to the arrangement of the embodiment described above, the horizontal positions of the imaging elements 6 are caused to differ by forming different angles between the reflection surfaces of the optical mirrors 5 and the light axes in the adjacent first imaging unit II and second imaging unit 12. Accordingly, the imaging elements 6 can be arranged so as not to spatially interfere with each other.

Consequently, similarly to the previous embodiment, the imaging element 6 having a relatively large-scaled package can be used.

It should be noted that the imaging apparatus is arranged such that the distances from the second lens groups 3B to the light receiving surface of the imaging elements 6 are approximately equal in FIGS. 6A and 6B. Accordingly, since the light path lengths from the front lens pieces 1 to the imaging elements 6 become approximately equal and the specifications required for the imaging elements 6 become approximately equal, an imaging element 6 having the same arrangement can be used easily.

According to each of the embodiments described above, the optical mirror 5 is placed between the second lens group 3B and the imaging element 6; however, the optical mirror may be arranged at other positions if placed behind the backside of the front lens piece 1 and at the front side of the imaging element 6.

In this case, the position at which the light is bent is located at the front side, and the parts of the second lens group 3B or the like are included in a unit other than the lens barrel 2.

According to each of the embodiments described above, the light from the subject is bent by reflecting the light on the optical mirror 5; however, the optical element is not limited to the optical mirrors, and an optical element having a reflection surface or the like and exhibiting a similar function also may be used.

According to each of the embodiments described above, any of the optical axes of the light bent by the optical mirror 5 are positioned within a vertical area including the center axis of the lens barrel 2 (in the direction directly above and in the direction directly under in FIG. 3; in the direction directly above in FIG. 5; and in the direction obliquely above in the vertical area in FIG. 6).

According to the present invention, the light is not limited to being bent within the vertical area including the center axis of the lens barrel; the light may be bent in the direction obliquely above or in the direction obliquely below relative to that vertical area.

It should be noted that if the mirror is inclined with a large angle from the vertical area, the light path may be interrupted by the connection surfaces of the adjacent imaging units, and therefore the mirror should not be inclined too much from the vertical area.

Next, according to still another embodiment, the optical elements of the imaging units are arranged such that the incident light is bent in the same direction of obliquely above relative to the vertical area including the center axis of the lens barrel, so that the optical elements of the imaging units do not spatially interfere with each other.

According to the present invention, the optical elements are arranged so as not to spatially interfere with each other in the adjacent imaging units, and thus the optical elements may be arranged such that the light is bent in different directions or bent at different positions.

It should be noted that not all the imaging units should include the equal arrangement.

For example, of the number of imaging units aligned in the horizontal direction, one or a plurality of imaging units arranged at the center portion may include a higher resolution as compared with the imaging units arranged in the peripheral portions.

Also, the angles of view may be different in respective imaging units.

Further, according to each of the embodiments described above, the imaging apparatus is arranged by attaching a plurality of imaging units in the horizontal direction; however, a plurality of imaging units attached in the horizontal direction may be laminated with a plurality of layers (LAYER).

In this case, the directions in which the light axes are bent are caused to coincide with each other in the same direction in the upper layer and the lower layer, and the imaging elements do not spatially interfere with each other for the upper and lower layers.

The present invention is not limited by the above-mentioned embodiments and other various arrangements in scope can be employed without departing from the gist of the present invention.

The invention claimed is:

1. An imaging apparatus for imaging a wide area as a subject by dividing the subject into a plurality of subject portions and respectively imaging the subject portions using a plurality of imaging means, characterized in that;
   said imaging means includes lenses and an imaging element for detecting light beams passing through said lenses, when selecting main light beams positioned in the Gauss region from the main light beams passing through a center of an aperture diaphragm of said lenses in said imaging means, and an NP point is defined as a point at which a straight line component of the selected main light beams in an object space is extended to intersect with an optical axis,
   respective NP points of said plurality of imaging means are concentrated within a minute radius region based on one of the NP points as a center;
   in each of said imaging means, an optical element having a reflection function is arranged behind a refraction surface of a lens located at the nearest position from the subject;
   said imaging element is arranged behind the optical element having said reflection function and outside of a space formed by straight lines which pass from said NP point to circumferential portions in respective directions of said lens;
   said NP point is arranged behind said optical element; and
   light beams bent by said optical element having the reflection function are imaged by said imaging element, wherein directions of the light beams bent by said optical element are different from each other.

2. The imaging apparatus according to claim 1, wherein said respective imaging elements are arranged so as not to spatially interfere with each other in the adjacent imaging means.

3. The imaging apparatus as set forth in claim 1, wherein the plurality of imaging means are arranged such that both of the imaging means are included with a space formed by straight lines passing from an NP point to outer circumferential portions of front lens pieces of said imaging means in respective directions in the horizontal direction.

4. The imaging apparatus as set forth in claim 1, wherein the plurality of imaging means include a first imaging means arranged such that the optical axis is bent in a first direction by an optical mirror, and a second imaging means arranged such the optical axis is bent in a second direction opposite to said first direction.

5. An optical device, comprising:
   an imaging apparatus for imaging a wide area as a subject by dividing the subject into a plurality of subject portions and respectively imaging the subject portions using a plurality of imaging units, characterized in that:
   said imaging units each includes lenses and an imaging element for detecting light beams passing through said lenses, when selecting main light beams positioned in the Gauss region from the main light beams passing through a center of an aperture diaphragm of said lenses in said imaging means, and an NP point defined as a point at which a straight line component of the selected main light beams in an object space is extended to intersect with an optical axis,
   respective NP points of said plurality of imaging units are concentrated within a minute radius region based on one of the NP points as a center;
   an optical element in each of said imaging units and having a reflection function is arranged behind a refraction surface of a lens located at the nearest position from the subject;
   wherein said imaging element is arranged behind the optical element having said reflection function and outside of a space formed by straight lines which pass from said NP point to circumferential portions in respective directions of said lens;
   said NP point is arranged behind said optical element; and
   light beams bent by said optical element having the reflection function are imaged by said imaging element, wherein directions of the light beams bent by said optical elements are different from each other.

6. The imaging apparatus according to claim 5, wherein said respective imaging elements are arranged so as not to spatially interfere with each other in the adjacent imaging means.

7. The imaging apparatus as set forth in claim 5, wherein the plurality of imaging units are arranged such that both of the imaging units are included with a space formed by straight lines passing from an NP point to outer circumferential portions of front lens pieces of said imaging units in respective directions in the horizontal direction.

8. The imaging apparatus as set forth in claim 5, wherein the plurality of imaging units include a first imaging unit arranged such that its optical axis is bent in a first direction by an optical mirror, and a second imaging unit arranged such its optical axis is bent in a second direction opposite to said first direction.

* * * * *